United States Patent [19]

Blum

[11] E Re. 28,643

[45] Reissued Dec. 9, 1975

[54] ORNAMENTAL RAILING

[75] Inventor: Harry P. Blum, Pittsburgh, Pa.

[73] Assignee: Blumcraft of Pittsburgh

[22] Filed: Dec. 6, 1974

[21] Appl. No.: 530,215

Related U.S. Patent Documents

Reissue of:

[64] Patent No.: 3,358,969
Issued: Dec. 19, 1967
Appl. No.: 513,261
Filed: Dec. 13, 1965

[52] U.S. Cl. ..... 256/24; 256/59
[51] Int. Cl.[2] ..... E04H 17/14
[58] Field of Search ..... 256/21, 22, 24, 59, 65–70; 52/584, 582, 585; 248/468, 473, 475, 476, 477, 488, 489, 490, 491, 494

[56] References Cited

UNITED STATES PATENTS

| | | | |
|---|---|---|---|
| 534,545 | 2/1895 | Breadner | 256/24 X |
| 1,462,622 | 7/1923 | Phelan | 52/584 |
| 1,776,785 | 9/1930 | Davidson | 256/24 |
| 2,618,145 | 11/1952 | Sinner et al. | 52/584 X |
| 2,771,259 | 11/1956 | Laystrom | 248/489 |
| 2,873,094 | 2/1959 | Blum | 256/31 |
| 3,027,795 | 4/1962 | Spadaro | 248/489 X |
| 3,265,417 | 8/1966 | Kastan | 52/582 X |
| 3,321,059 | 5/1967 | Kroepel | 256/24 |

FOREIGN PATENTS OR APPLICATIONS

| | | | |
|---|---|---|---|
| 615,470 | 2/1961 | Canada | 256/24 |

OTHER PUBLICATIONS

Architectural Forum, Jan. 1940, Vol. 72, pp. 23, 24, 25 & 28.

*Primary Examiner*—Dennis L. Taylor
*Attorney, Agent, or Firm*—Paul & Paul

[57] ABSTRACT

An ornamental railing adapted for mounting alongside a stairway or other building surface wherein the sole vertical supporting means comprises a plurality of aligned glass panels.

9 Claims, 15 Drawing Figures

INVENTORS.
Louis Blum &
William J. Horgan, Jr.
BY Paul & Paul
ATTORNEYS.

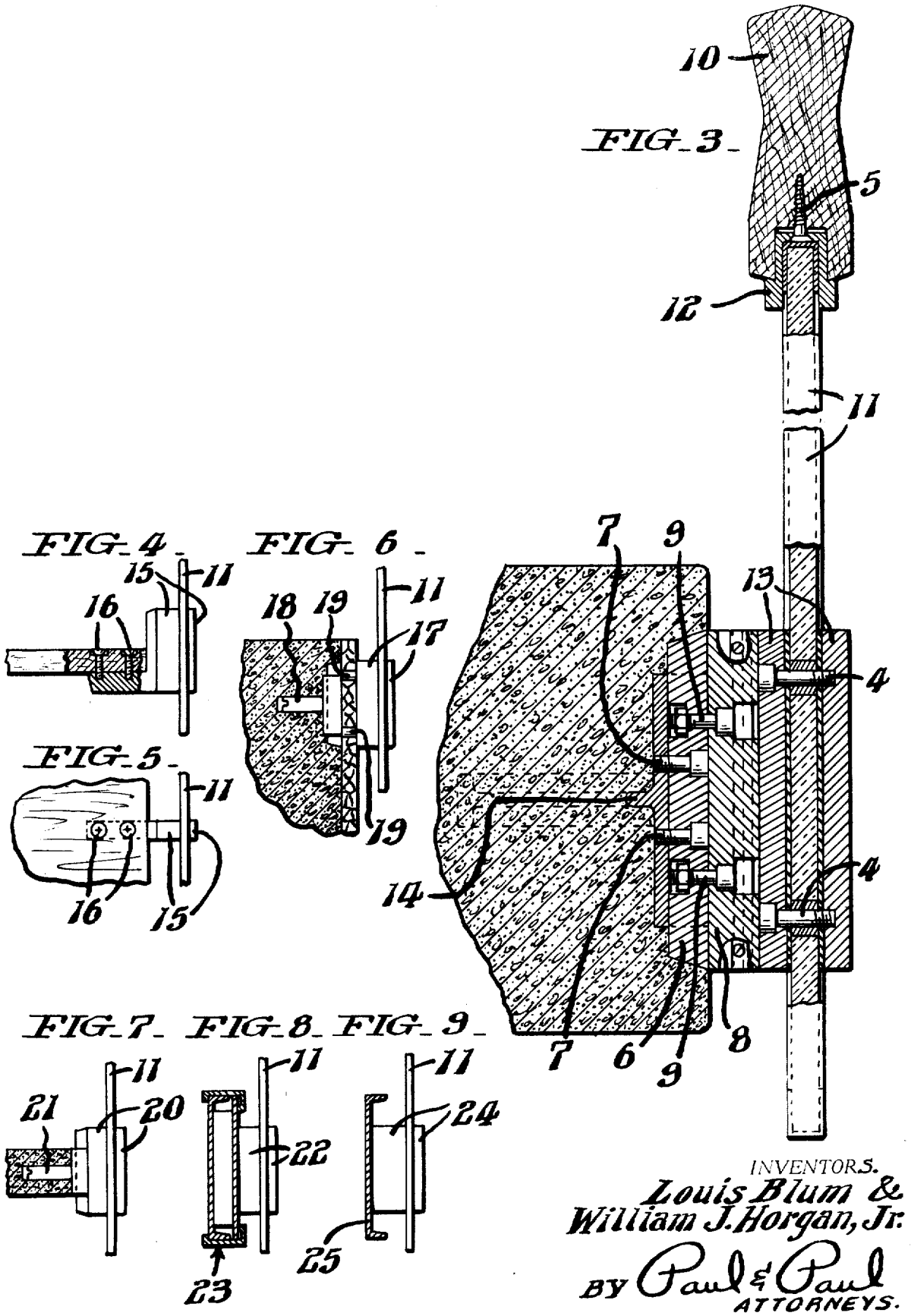
INVENTORS.
Louis Blum &
William J. Horgan, Jr.
BY Paul & Paul
ATTORNEYS.

INVENTORS.
Louis Blum &
William J. Horgan, Jr.
BY Paul & Paul
ATTORNEYS.

INVENTORS.
Louis Blum &
William J. Horgan, Jr.
BY Paul & Paul
ATTORNEYS.

INVENTORS.
Louis Blum &
William J. Horgan, Jr.
BY Paul & Paul
ATTORNEYS.

ORNAMENTAL RAILING

Matter enclosed in heavy brackets [ ] appears in the original patent but forms no part of this reissue specification; matter printed in italics indicates the additions made by reissue.

BACKGROUND OF THE INVENTION

Field of the Invention

The invention relates to ornamental railings.

Description of the Prior Art

This invention relates to ornamental railings and particularly to ornamental railings in which the vertical supports comprise glass panels. Glass panels have been used prior to this time in ornamental railings; however, they have been used for ornamentation rather than as vertical structural supports. By virtue of the present invention, it is proposed to provide ornamental railing structure in which the vertical support for the handrail comprises solely glass panels.

The new ornamental railing of the invention comprises glass panels which provide the sole vertical support, creating the illusion that the handrail is floating in space free of any rigid structural support. The glass panels are anchored into the floor or stairway of a building.

In the accompanying drawings:

FIG. 3 is a view partly in cross-section and partly broken away along the line III—III of FIG. 1;

FIG. 4 is a partial sectional view similar to FIG. 3 showing an alternate means for mounting the railing;

FIG. 5 is a partial top view of the structure illustrated in FIG. 4;

FIG. 6 is a partial sectional view similar to FIG. 3 showing an alternate means for mounting the railing;

FIG. 7 is a partial sectional view similar to FIG. 3 showing an alternate means for mounting the railing;

FIG. 8 is a partial sectional view similar to FIG. 3 showing an alternate means for mounting the railing;

FIG. 9 is a partial sectional view similar to FIG. 3 showing an alternate means for mounting the railing;

Figure 1:
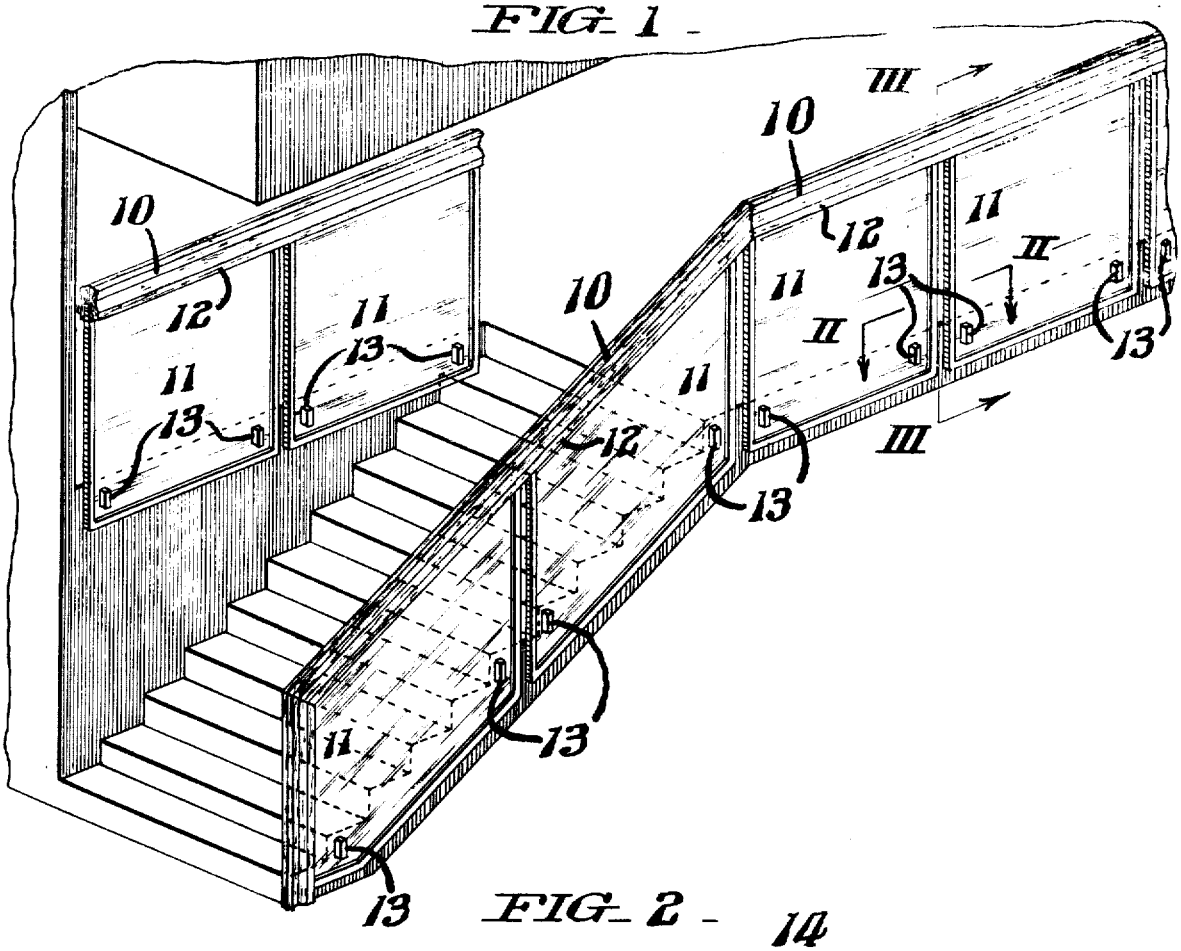
FIG. 1 is a perspective view of a stairway showing railings made in accordance with the invention.
Figure 2:
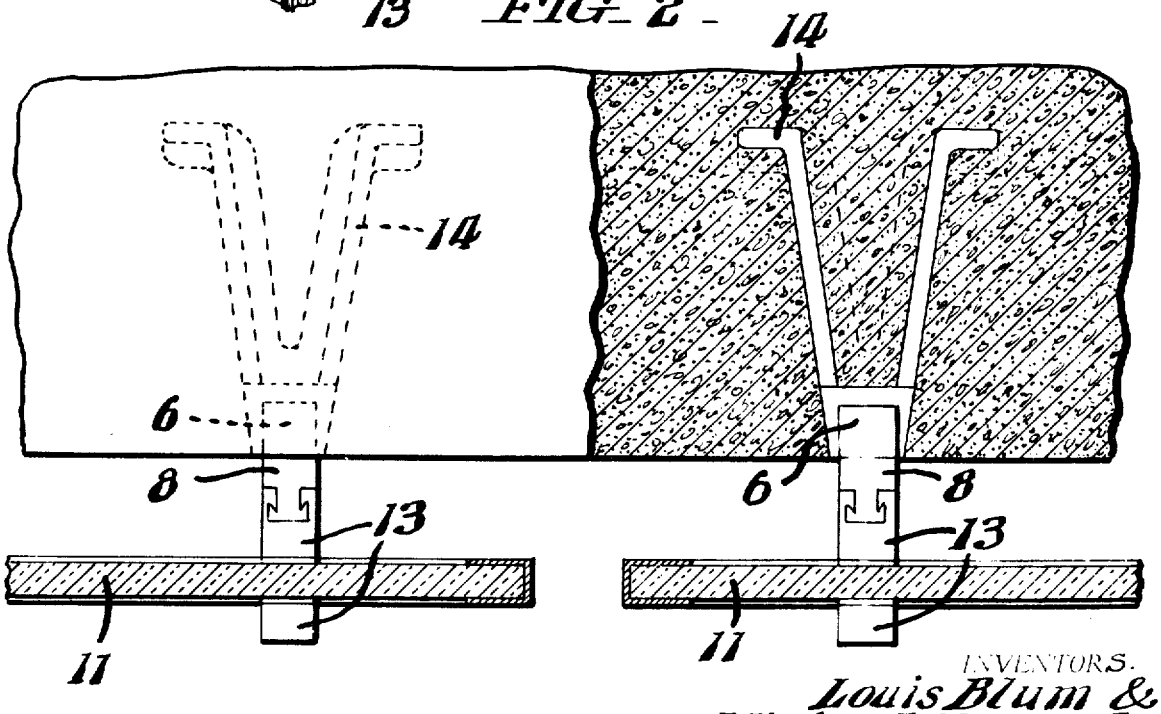
FIG. 2 is a view partly in cross-section along the line II—II of FIG. 1.
Figure 10:
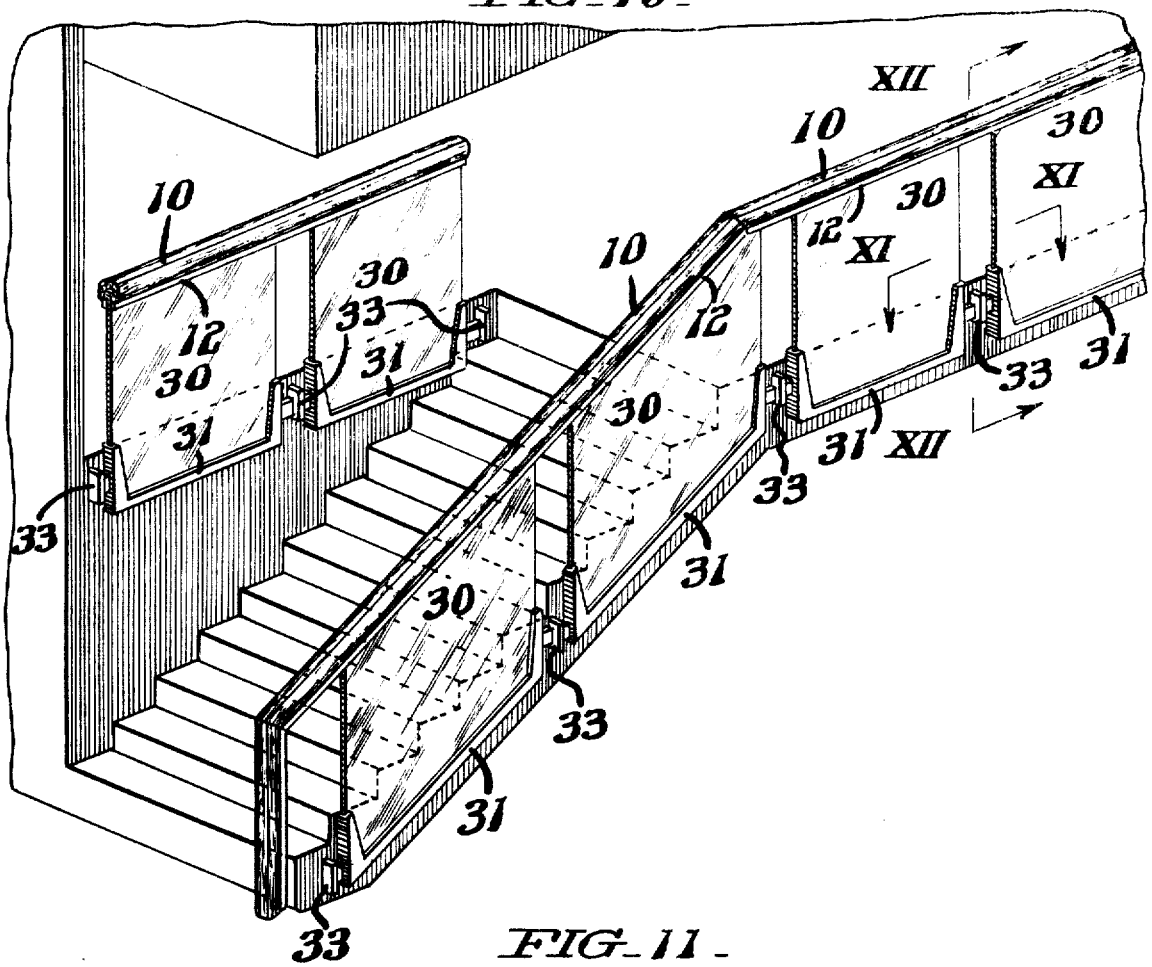
FIG. 10 is a perspective view similar to FIG. 1 showing another embodiment of the invention.
Figure 13:
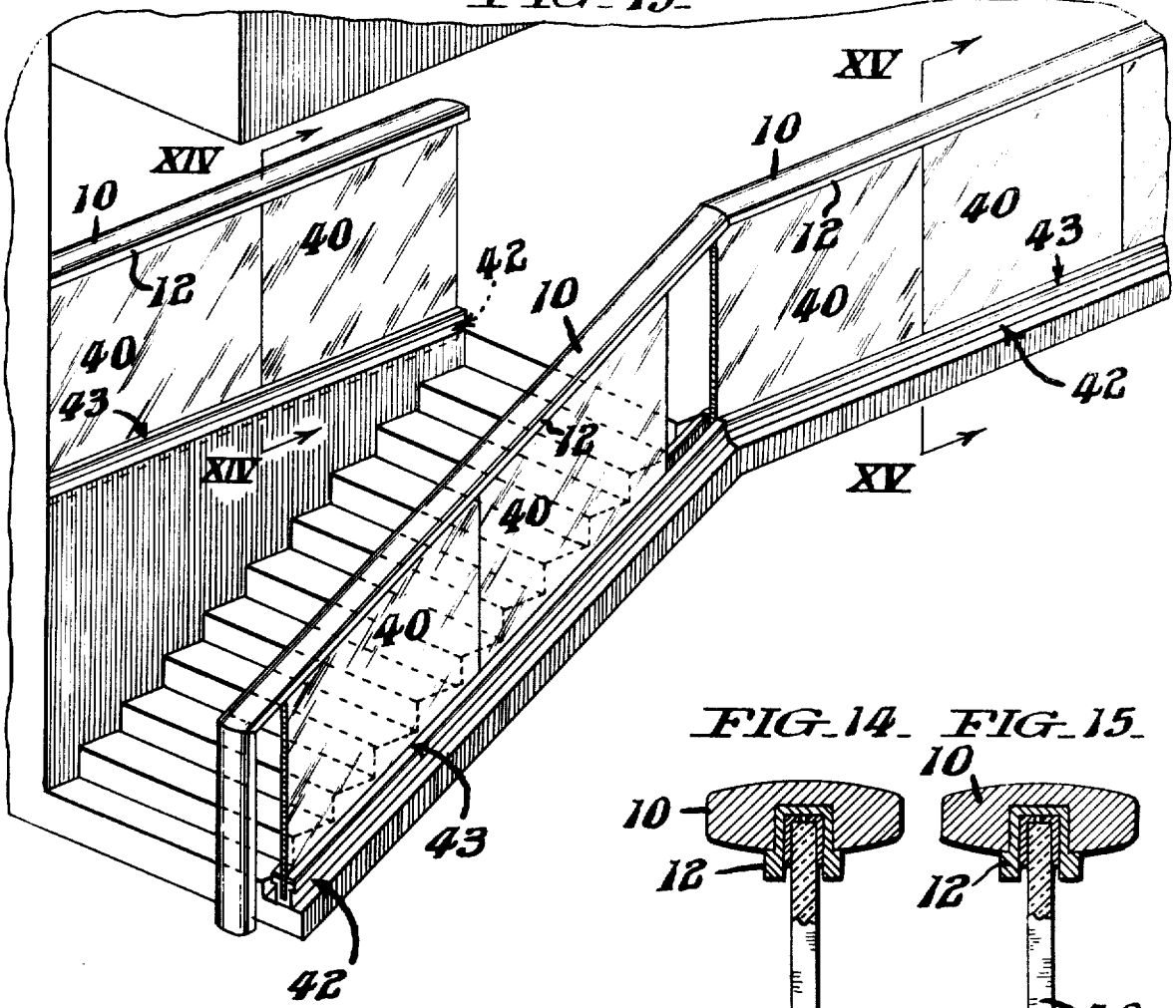
FIG. 13 is a perspective view similar to FIG. 1 showing another embodiment of the invention.

Railings embodying the invention are shown in FIGS. 1, 10 and 13. Taking first the railing of FIG. 1, the handrail 10 is mounted on top of the glass panels 11. The connection between the handrailing 10 and the glass 11 is best illustrated in FIG. 3. A connecting strip 12 running longitudinally of the glass panel 11 is bonded thereto by means of an adhesive. The connecting strip 12 is in turn connected by screw 5 to the wooden handrail 10 completing the connection between the handrail 10 and the glass panel 11. At the lower portion of the glass panel 11 it is carried upon a mounting bracket 13 which gives the appearance of passing through the glass panel 11. The mounting bracket 13 is supported upon an anchor 14 which is embedded in the stairway or floor of the building. To the anchor 14 is affixed by means of bolts 7 a connecting strip 6. A second connector strip 8 is connected to the first strip 6 by means of additional bolts 9 providing for adjustment between the two connecting strips. The mounting bracket 13 is slidably connected to the connecting strip 8 by means of the interengaged key-slot connection shown best in FIG. 2. The mounting bracket 13 embraces the glass panel 11 and is held thereto by means of the bolts 4 illustrated in FIG. 3.

Modifications of the means for mounting the glass panels on the floor or stairway are shown in FIGS. 4, 5 and 6 in fragmentary views. In FIG. 4 the mounting bracket 15 takes the place of the bracket 13 of FIG. 3. There the bracket 15 is affixed to the underside of the wooden stair tread by means of the screws 16. FIG. 5 is a top view of the arrangement of FIG. 4. FIG. 6 illustrates a further modification of the means for mounting the glass panel wherein the mounting bracket 17 is connected to the anchor 18 by means of connector bolts 19. A further modification is shown in FIG. 7 where the mounting bracket 20 is connected directly to the anchor 21. In FIG. 8 the mounting bracket 22 is connected to a structural beam 23. Another variation of the type of mounting is shown in FIG. 9 where the mounting bracket 24 is connected to the open channel of a channel beam 25.

Figure 11:
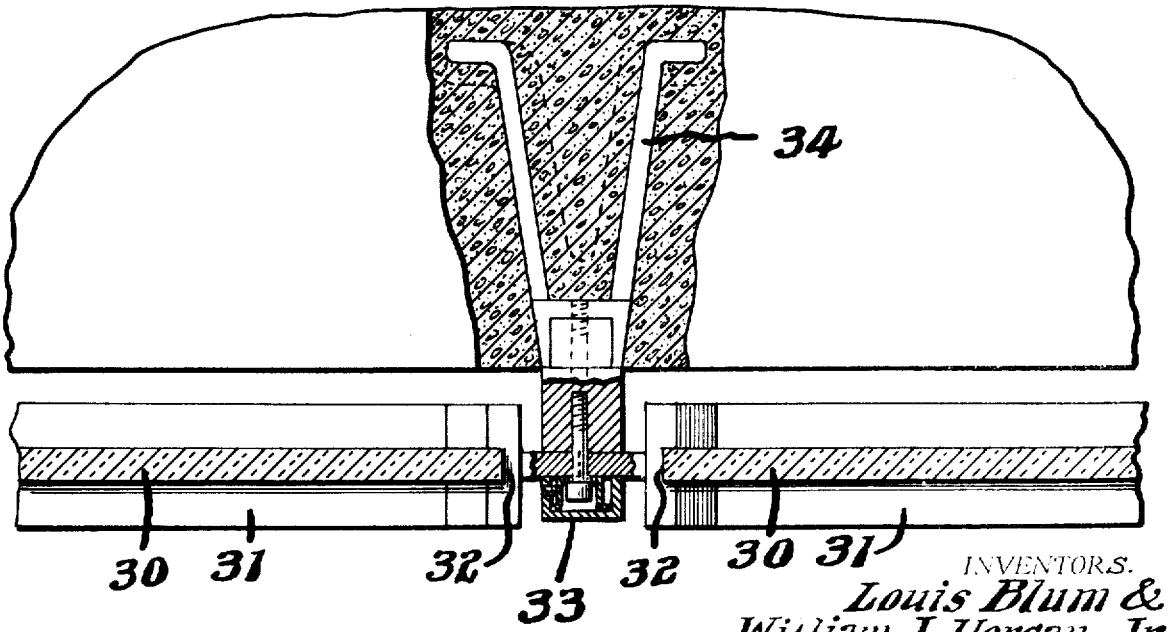
FIG. 11 is a view partly in cross-section along the line XI—XI of FIG. 10.
Figure 12:
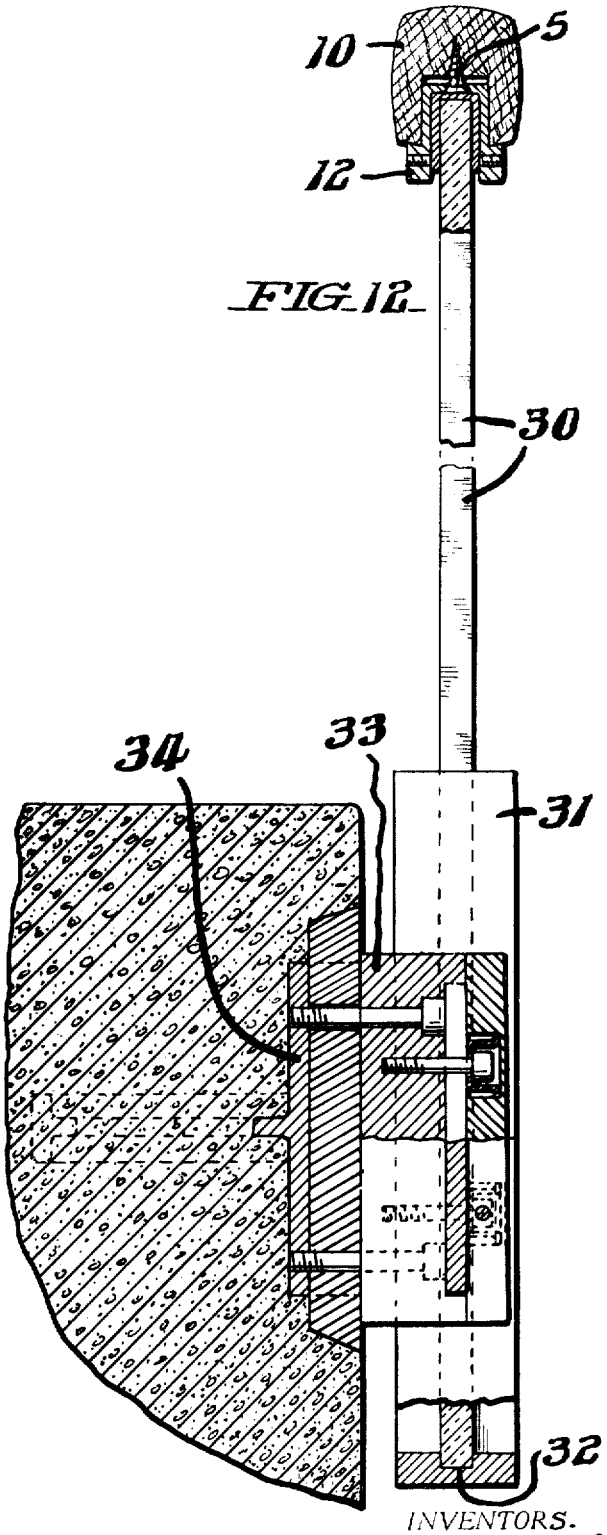
FIG. 12 is a partial fragmentary view along the line XII—XII of FIG. 10.

Another embodiment of the invention is shown in FIGS. 10–12 wherein the handrail is connected to the glass panel in the manner previously described. Here, however, the glass panel 30 is mounted in a frame 31. The mounting frame 31 is a U-shaped structural member having a slot 32 formed therein. The glass panel 30 fits within the slot 32 and is bonded thereto by an adhesive. The mounting frame 31 is connected to the building by means of connecting brackets 33 which are in turn connected to anchors 34 as shown more particularly in FIGS. 11 and 12. Other means may be used for connecting the mounting frame 31 to the structure of the building employing the means illustrated in FIGS. 4–9.

Figures 14, 15:
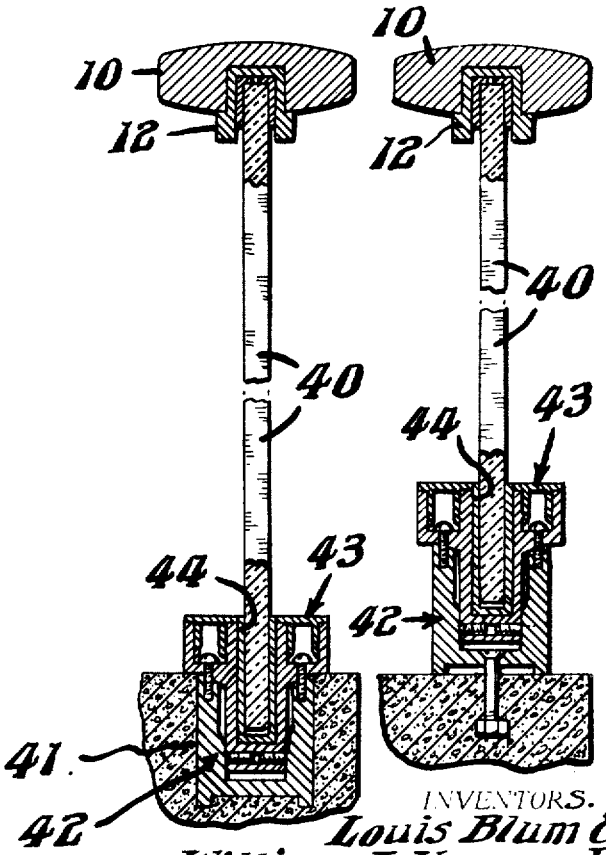
FIG. 14 is a partial fragmentary view along the line XIV—XIV of FIG. 13.
FIG. 15 is a partial fragmentary view along the line XV—XV of FIG. 13.

Another embodiment of the invention is shown in FIGS. 13–15 wherein the glass panels 40 are mounted directly upon or within the floor or side of the stair tread. In FIG. 14 one such structure is shown. There a slot 41 is formed in the floor of the building. In the slot 41 a structural receiving member 42 is inserted. A mounting bracket 43 is rigidly connected to the member 42. The member 43 has a channel 44 formed therein to receive the glass panel 40 along its lower edge. The glass panel 40 is bonded to the slot by means of an adhesive. Another variation of this embodiment is shown in FIG. 15 where the members 42, 43 and 44 are fixed directly to the surface of the floor.

Employing the means for connecting the rail to the glass panel and the several embodiments of structural means for mounting the glass panels to the building shown herein, a railing is formed comprising a plurality of glass panels which are connected along their lower edges by means of the mounting brackets or other such means and along the common upper edges by means of the handrail. This forms a unitary structure embodying the handrail, the glass panel and the mounting brackets which provides a railing structure having sufficient rigidity in strength to satisfy normal building requirements.

It will be understood that many variations may be made in the specific embodiments of the invention illustrated herein without departing from the scope of the invention as defined by the following claims.

What is claimed is:

[ 1. An ornamental railing comprising a continuous handrail, railing mounting means for connecting said handrail to a building structure and handrail supporting means connecting said mounting means and said handrails comprising a plurality of aligned glass panels, said glass panels supporting said handrail means, and bracket means rigidly affixed to the building structure retaining said glass panels in substantially rigid spaced relation to said building structure.]

[ 2. The ornamental railing of claim 1 wherein the mounting bracket means comprises a pair of spaced brackets having a first part rigidly affixed to the stairway or other building structure on the side of the glass panel adjacent thereto, and a second part on the side of the glass panel remote from the stairway or building structure, the two parts of the mounting bracket being connected by bolt means.]

[ 3. The ornamental railing of claim 1 wherein the bracket means comprises a channel member rigidly affixed to said building structure.]

*4. An ornamental railing comprising a continuous handrail, railing mounting means for connecting said handrail to a building structure and handrail supporting means connecting said mounting means and said handrails comprising a plurality of aligned glass panels, said glass panels supporting said handrail means, and bracket means rigidly affixed to the building structure retaining said glass panels in substantially rigid spaced relation to said building structure, wherein the bracket means comprises a channel member rigidly affixed to said building structure, wherein a structural receiving means is provided, carried by the building structure, and in which the channel member is received, including means rigidly connecting the channel member and structural receiving means.*

*5. The ornamental railing of claim 4, wherein said structural receiving means is provided with upstanding portions, upper ends of which are overlain by spaced apart laterally overlying portions of said bracket means, and wherein the means rigidly connecting the channel member and structural receiving means comprises fastener members.*

*6 The ornamental railing of claim 4, wherein said structural receiving means is of generally U-shaped cross-sectional configuration.*

*7. The ornamental railing of claim 5, wherein said upstanding portions have upper inner spaced apart surfaces spaced from the therebetween received channel members and lower inner spaced apart surfaces more closely adjacent the therebetween received channel member.*

*8. The ornamental railing of claim 5, wherein said structural receiving means is of generally U-shaped cross-sectional configuration, wherein said upstanding portions have upper inner spaced apart surfaces spaced from the therebetween received channel member and lower inner spaced apart surfaces more closely adjacent the therebetween received channel member, and including an adhesive in bonded relation between a slot of said channel member and said glass panels.*

*9. The ornamental railing of claim 6 wherein the upper ends of said upstanding portions have sloped upper surfaces and wherein the overlying portions of said bracket means include sloped surfaces disposed thereagainst.*

*10. An ornamental railing comprising a continuous handrail, railing mounting means for connecting said handrail to a building structure and handrail supporting means connecting said mounting means and said handrails comprising a plurality of aligned glass panels, said glass panels supporting said handrail means, and bracket means rigidly affixed to the building structure retaining said glass panels in substantially rigid spaced relation to said building structure, wherein the bracket means comprises a channel member rigidly affixed to said building structure, said channel member being a member having a channel therein and being disposed with the channel along the lower edges of the glass panels with portions of the channel member extending up along lower opposite sides of the glass panels.*

*11. The railing of claim 10, wherein a structural receiving means is provided, carried by the building structure, and in which the channel member is received, including means rigidly connecting the channel member and structural receiving means, and wherein said structural receiving means is provided with up-standing portions, upper ends of which are overlain by spaced-apart laterally overlying portions of said bracket means, and wherein the means rigidly connecting the channel member and structural receiving means comprise fastener members.*

*12. The railing of claim 11, wherein the upper ends of said up-standing portions have sloped upper surfaces and wherein the overlying portions of said bracket means include sloped surfaces disposed thereagainst.*

* * * * *

UNITED STATES PATENT OFFICE

CERTIFICATE OF CORRECTION

Patent No. Re. 28,643 Dated December 9, 1975

Inventor(s) Louis Blum and William J. Horgan, Jr.

It is certified that error appears in the above-identified patent and that said Letters Patent are hereby corrected as shown below:

Item [75] should read:

-- Louis Blum and William J. Horgan, Jr., both of Pittsburgh, Pa. --

Signed and Sealed this

*fourth* Day of *May 1976*

[SEAL]

*Attest:*

RUTH C. MASON
*Attesting Officer*

C. MARSHALL DANN
*Commissioner of Patents and Trademarks*